S. AND W. E. LATTERELL.
MEANS FOR TIGHTENING LOOSE RIMS AND SPOKES ON AUTOMOBILE WHEELS.
APPLICATION FILED DEC. 11, 1918.
1,331,653.
Patented Feb. 24, 1920.
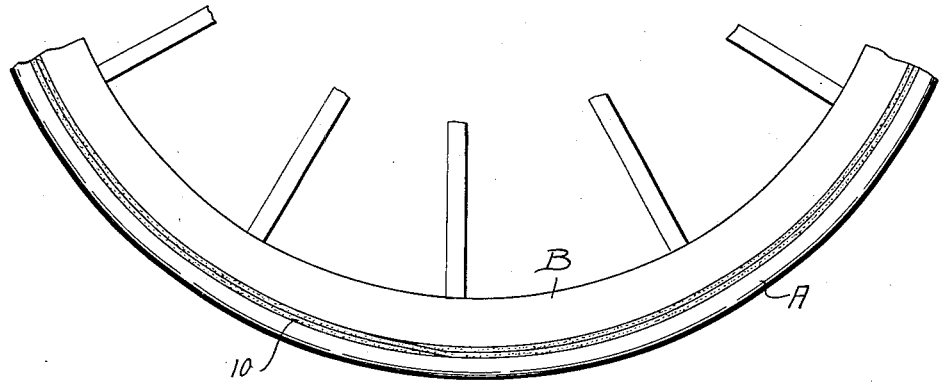
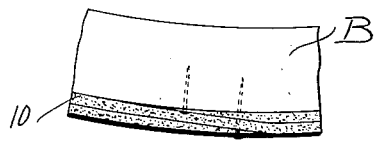
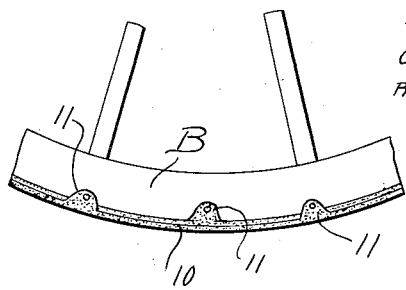
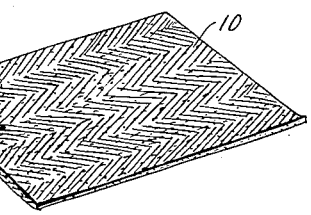
Inventors
S. Latterell and
W. E. Latterell
By Watson E. Coleman
Attorney

UNITED STATES PATENT OFFICE.

SAMUEL LATTERELL AND WILLIAM E. LATTERELL, OF DEEPCREEK, WASHINGTON.

MEANS FOR TIGHTENING LOOSE RIMS AND SPOKES ON AUTOMOBILE-WHEELS.

1,331,653.     Specification of Letters Patent.     Patented Feb. 24, 1920.

Application filed December 11, 1918. Serial No. 266,353.

*To all whom it may concern:*

Be it known that we, SAMUEL LATTERELL and WILLIAM E. LATTERELL, citizens of the United States, residing at Deepcreek, in the county of Spokane and State of Washington, have invented certain new and useful Improvements in Means for Tightening Loose Rims and Spokes on Automobile-Wheels, of which the following is a specification, reference being had to the accompanying drawings.

This invention relates to the art of tire setting and particularly to a means for and method of tightening or setting the iron rims to wooden automobile wheels, when the wooden wheel has shrunk or become loosened with reference to the rim.

It is a matter of common experience that in wooden automobile wheels having iron rims, the iron rim expands under friction caused by use leaving a gap between the iron rim and the wooden rim or felly of the wheel. The wooden rim or felly, under these circumstances, becomes loose from the spokes and thus the spokes become loose from the hub. This loosening process takes place quite early in the life of the wheel.

Under ordinary circumstances, it would be a relatively simple matter to shrink the iron rim upon the wheel after the felly of the wheel has shrunk, but the iron rim of an automobile cannot be shrunk by cutting, welding and setting like the tires of other wheeled vehicles because it must be left of its original size in order that it may fit the rubber casing that goes over it and the pneumatic inner tube.

The general object of this invention is to provide means whereby the space between the felly of the wooden wheel and the metallic rim may be filled and the rim shrunk into place upon the filling without permitting any such contraction of the rim as would render it unfit for use with the proper sized shoe and inner tube of the pneumatic tire.

A further object of this invention is to provide a filler in the nature of a tape which is impregnated or saturated with a certain substance or substances which will become soft under heat, which tape may be wrapped upon the felly of the wheel to an extent sufficient to fill the gap between the periphery of the felly and the metallic rim, and which will permit the iron rim to be contracted upon this filling tape.

Another object in this connection is to provide a tape impregnated or otherwise filled with a substance of such character that it will withstand the heat of the iron rim when the latter is being applied and shrunk upon the tape, and further of such character that after cooling the substance or substances with which the tape is impregnated will become hard to such degree that it will not powder, break away, or chip, in other words, provide a composition for this purpose which forms a cement sufficiently elastic to unite the surfaces of the rim, the filler and the felly together, and snugly fill all space between the rim and felly so that neither dust, mud, sand moisture, or water can enter.

Other objects will appear in the course of the following description.

Our invention is illustrated in the accompanying drawings, wherein:—

Figure 1 is a fragmentary side elevation of a wheel with our improved filler disposed between the rim and the felly;

Fig. 2 is a fragmentary elevation of the felly, showing the manner in which the filler is applied;

Fig. 3 is a like view to Fig. 2 but showing a modified form of holding the filler in place upon the felly; and Fig. 4 is a fragmentary perspective view of the impregnated web which forms the filler.

As before stated, generally speaking, this invention consists in the use of a tape or strip of woven fabric which is adapted to be used as a filler. A portion of such a strip is indicated in Fig. 4. This strip, tape or webbing 10 is formed of any desired length and is, broadly speaking, composed of cotton, linen, jute and sisal hemp. We do not wish to be limited, however, to these fibers. This woven strip, tape or webbing has a width equal to that of the felly to which it is to be applied, and, as before stated, may be of any suitable length, and is saturated with a solution composed of crude asphaltum 75%, resin 10% and crude oil 10%. The asphaltum, resin and oil are placed in a boiler and heated to a temperature of about 200° F. until they are thoroughly mixed. Then the tape is saturated with the mixture while it is hot. After the tape has absorbed all the solution it will hold it is cooled to such a degree as still to be adhesive and then it is passed through Portland cement or dusted with it to an amount that will adhere to the tape. We have found that this is about 5% of the entire mixture. The cement fulfils two purposes. It prevents the tape from sticking together when put up in rolls and acts as a filler or body in the solution. The tape or webbing so saturated forms an article of manufacture which may be sold in rolls or in convenient lengths for application to any wheel. We do not wish to be limited to the exact ingredients above specified, however, as hard pitch, tar, paraffin, crude oil and other ingredients of more or less like character could be used but these ingredients would not secure the perfected results as would a tape impregnated with the materials above specified and in the proportions stated.

When it is desired to repair a wheel, the felly of which is shrunk relative to the rim so as to leave a space between the rim A and felly B, the rim is removed from the wheel and the webbing or tape is applied over the wooden rim of the wheel to such thickness as may be required to fill the space between the wooden rim and the metallic rim. This is readily secured by attaching one end of the tape or webbing to the periphery of the felly by tacks or other like means and then winding the same around the surface of the felly to an extent depending upon the thickness of the webbing and the distance between the felly and the rim. After the tape or webbing has been wound tightly upon the felly, a couple of tacks or brads are attached to the outer end of the webbing or tape and driven into the wheel so as to hold the filler in place until the metallic rim is shrunk on. The metallic rim is then heated to expand it to an extent sufficient to permit it to be forced over the filler and then the wheel is allowed to cool. The asphalt, resin, and crude oil impregnating the filler and the cement, prevents the fabric of the filler from burning.

The impregnated solution, as before stated, will withstand the amount of heat given off by the metallic rim when it is expanded and then allowed to contract upon the felly but after being cooled this impregnating compound hardens to such a degree that in use it will not pound out, powder or crack. In other words, the compound forms a cement sufficiently elastic to unite the surfaces of the iron rim, the filler and the wooden rim together, closely filling all parts so that neither dust, snow, mud, or moisture can enter. The heat caused by friction with the wheel by the surface of the road at high speed does not affect this compound except that it softens slightly and accordingly expands slightly but not to the extent that it will run out or ooze out from the webbing. As the wheel cools the impregnated compound contracts and hardens somewhat but not to the extent of its becoming brittle and powdering. At all times this filler will leave a tight joint between the wheel and the felly.

The practical value of this manner of repairing automobile wheels will be obvious. Large numbers of these wheels are being discarded every day because of the general loosening of the wooden joints and the process above outlined will restore these wheels to usefulness at relatively slight cost. This method of repairing these wheels can be performed at any repair shop and by this process two men can repair practically any wheel in an hour at an expense of from $1.50 to $5 per wheel. This method of repairing automobile wheels does not injure the wheel nor leave any unsightly joint or edge. In case any portion of the filler projects from the joint by reason of the compression of the iron rim, it can be trimmed off with a sharp knife while the filler is still warm. A small brush full of paint passed over the rim edge or joint covers the filler and the appearance of the wheel is the same as if the space had not been filled. A band of this tape filler $\frac{1}{32}''$ in thickness is sufficient to fill what was previously a relatively large space between the iron rim and the felly and to take out all squeak and rattle in the wheel. This method and the filler heretofore described may also be applied to a new wheel, as well as to an old one.

The necessity for this rises from the fact that the friction of use in case of a new wheel will cause an expansion of the iron rim and its separation from contact with the wooden rim the same as in worn wheels, but if a very thin layer of this filler be applied over the circumference of this rim when the wheel is initially built, it will prevent this breaking apart of the rims.

In Fig. 3, we illustrate the webbing 10 as being provided with laterally extending ears 11 whereby the webbing may be temporarily attached to the felly B until the metallic rim is shrunk in place.

Asphaltum forms the base of the mixture. It softens with heat so as to fill all spaces and will stand the necessary amount of heat without burning. When cool, it is hard but still elastic enough not to powder up and come out. Asphaltum alone, when melted, will not be thin enough to penetrate the webbing readily but by adding resin and crude oil the desired result is obtained. The oil acts to cut the asphaltum but if oil alone is used it would leave the asphaltum too soft when cooled. Resin helps to cut the asphaltum and when cooled hardens. When the saturated webbing is applied to the wooden rim the heat of the iron rim softens the mixture so that the layers of webbing adhere together and all spaces are filled up. The wooden rim absorbs the oils leaving when the wheel is cooled, all the space filled with a tough, substance like hard rubber sufficiently adhesive to bind all together like a cement.

We claim:—

1. As an article of manufacture, a filler for filling the space between a shrunken felly and a metallic rim, consisting of a web of textile fabric impregnated with a composition consisting of crude asphaltum, resin and crude oil.

2. As an article of manufacture, a filler for filling the space between a shrunken felly and a metallic rim, consisting of a web of textile fabric impregnated with a composition of crude asphaltum 75%, resin 10%, and crude oil 10%.

3. As an article of manufacture, a filler for filling the space between a shrunken felly and a metallic rim, consisting of a relatively narrow web of textile fabric impregnated with a composition consisting of approximity crude asphaltum 75%, resin 10%, and crude oil 10%, the impregnated web being coated with powdered Portland cement.

4. As an article of manufacture, a filler for filling the space between a shrunken felly and a metallic rim consisting of a web of textile fabric impregnated with a composition consisting of crude asphaltum, resin and crude oil, and dusted with powdered Portland cement while the composition is hot and relatively soft.

5. As an article of manufacture, a filler for filling the space between a shrunken felly and a metallic rim, consisting of a web of textile fabric impregnated with a cement softening under a relatively high degree of heat and hardening under cold, said web being in the form of a relatively narrow strip and having laterally extending tabs at intervals.

In testimony whereof we hereunto affix our signatures in the presence of two witnesses.

SAMUEL LATTERELL.
WILLIAM E. LATTERELL.

Witnesses:
  BERTHA C. BORDEN,
  HERBERT A. BORDEN.